United States Patent [19]

Yokoyama et al.

[11] Patent Number: 4,640,613

[45] Date of Patent: Feb. 3, 1987

[54] IMAGE DATA COMPARISON CIRCUIT FOR RANGEFINDERS

[75] Inventors: Shotaro Yokoyama; Takashi Nishibe, both of Kanagawa, Japan

[73] Assignees: Fuji Electric Corporate Research and Development, Ltd.; Fuji Electric Company, Ltd., both of Kanagawa, Japan

[21] Appl. No.: 615,880

[22] Filed: May 31, 1984

[30] Foreign Application Priority Data

Jun. 21, 1983 [JP] Japan ................. 58-111173

[51] Int. Cl.[4] .......................... G01C 3/00; G01C 5/00; G03B 3/00
[52] U.S. Cl. ........................ 356/1; 354/403; 354/408
[58] Field of Search ............... 356/1; 354/403, 408

[56] References Cited

U.S. PATENT DOCUMENTS 3,945,023  3/1976  Stauffer ............................ 356/1
4,189,232  2/1980  Asano et al. ..................... 356/1

FOREIGN PATENT DOCUMENTS 2142497  1/1975  United Kingdom ............... 354/408

Primary Examiner—Stephen C. Buczinski
Attorney, Agent, or Firm—Brumbaugh, Graves, Donohue & Raymond

[57] ABSTRACT

In the particular embodiments of the invention disclosed herein, an image data comparison circuit receives digital image signal trains from two light sensor arrays of a rangefinder and compares the signals in the signal trains while they are being shifted with respect to each other. In one embodiment a set of coincidence detectors compares each signal in one signal train with all of the signals in one segment of the other image train and the number of coincidence detections by each detector is accumulated as the signal trains are cycled through corresponding shift registers. Another embodiment includes coincidence detectors for comparing all of the signals in corresponding segments of the two signal trains simultaneously.

2 Claims, 12 Drawing Figures

IMAGE DATA COMPARISON CIRCUIT FOR RANGEFINDERS

BACKGROUND OF THE INVENTION

The present invention relates to circuits for use in optical rangefinders and, more particularly, to a new and improved optical rangefinder circuit adapted to compare signals from two optical sensor arrays to determine the distance to an object.

Optical rangefinders for cameras and the like have been known for a long time. Recent years have seen the advent of a purely electronic rangefinder containing no movable parts at all. Such rangefinders have attracted a great deal of attention because they are small in size, inexpensive to manufacture, and highly accurate.

The principles of conventional electronic rangefinders are shown in FIGS. 1 and 2 of the accompanying drawings. As illustrated in FIG. 1, beams of light, such as reflected sunlight emitted from an object 1 at a distance which is to be measured, follow two spatially different optical paths 4 and 5 and fall on a pair of small lenses 2 and 3 mounted in an optical instrument. The lenses are spaced by a base distance b from each other and each lens has a focal length f.

In the illustrated example, the object 1 has a luminous intensity distribution represented by two mountain shapes. Images 7 and 8 of the object, each having a corresponding luminous intensity distribution, are focused by the lenses 2 and 3 on a common focal plane 6. For the sake of brevity, the center of the object 1, represented by the center of the luminous intensity distribution 1c, is shown as being positioned on the axis of the small lens 2 so that the path 4 coincides with that axis. The image 7 formed in the focal plane 6 by the small lens 2 has a center 7c which falls at a position 70, and the central position 70 of the image 7, being on the axis of the lens 2, does not change when the distance d between the object 1 and the lens 2 changes. When the distance d to the object 1 corresponds to infinity, so that the paths 4 and 5 are essentially parallel, the center 8c of the image 8 formed by the small lens 3 is positioned at a position 80 in the focal plane 6 behind the lens 3. As the distance d is reduced, the center 8c moves to the left as shown in FIG. 1. In the illustrated positional relationship, the image center 8c is located at a position 81 which is spaced a distance x from the original position 80 in the focal plane 6.

A pair of light sensor arrays 10 and 11 is disposed in the focal plane 6 at positions corresponding to the locations of the images 7 and 8 of the object 1 which are focused by the small lenses 2 and 3, respectively. The light sensor arrays 10 and 11 are generally composed of different numbers m and n of photovoltaic elements or photosensitive resistor elements. As shown in FIGS. 2A and 2B, each sensor element of the arrays generates an electric signal corresponding to the quantity of light which that sensor receives, for example, a signal directly proportional to the integrated intensity of the light incident on the element. Assuming the deviation distance x can be measured in some way, the distance d to the object 1 can be determined by the equation:

$$d = b \cdot f / x \qquad (1)$$

based on the simple principle of triangulation.

The signals produced by the sensors in the arrays 10 and 11 have analog values as represented in FIGS. 2A and 2B, and thus the distributions of the output signals along the light sensor arrays have the illustrated step-like patterns. While these analog values may be utilized in determining the deviation distance x, it is customary to quantize the analog values into digital values for simplifying the electronic circuitry and increasing the accuracy of the determination. According to the simplest quantizing means, the analog values are compared with an appropriate threshold voltage $V_t$ as shown in FIGS. 2A and 2B, and are converted into 1-bit digital values by regarding those analog values which are greater than the threshold voltage $V_t$ as having a digital value of "1", and those analog values which are less than the threshold voltage $V_t$ as having a digital value of "0", as illustrated in FIGS. 2C and 2D. The distributions of the digital values along the light sensor arrays 10 and 11 as shown in FIGS. 2C and 2D are then compared with each other by the electronic circuitry, so that the deviation distance x can be measured as represented by the number of sensors. Since the digital value distribution indicated by the dotted lines in FIG. 2D is produced when distance d to the object 1 is infinite and the deviation distance x is zero, the measurement of the distance d may be accomplished by determining the distance x on the light sensor array in FIG. 2D as expressed by the number of sensors between the detected digital value distribution and the corresponding dotted line distribution.

In the example of FIG. 1, a viewfinder for locating the object 1 to which the distance d is to be determined has an optical axis aligned with the optical axis of the small lens 2, that is, the small lens 2 faces the object 1 directly. However, the optical axis of a viewfinder is not generally in line with the optical axis of the small lens. Assuming that the viewfinder axis is positioned intermediate between the two small lenses 2 and 3, the images 7 and 8 on the light sensor arrays 10 and 11 of an object which is not at a finite distance are displaced corresponding rightward and leftward distances $x_1$ and $x_2$ from original positions in which the image would appear if the object 1 were at an infinite distance. In this case, the distance d to the object 1 can also be determined from the foregoing equation by employing $x = x_1 + x_2$. Accordingly, the measurement of the distance d remains equal to the determination of the deviation distance x of the images on the light sensor arrays.

A rangefinder circuit according to the prior art based on the foregoing principles is shown in FIG. 3. FIG. 3 illustrates two shift registers 12 and 13 storing digital image signals obtained by quantizing output signals as shown in FIGS. 2A and 2B from the light sensor arrays 10 and 11 of FIG. 1 with analog-to-digital converters (not shown), the digital image signals being stored in the same sequence as that in which the sensors are arrayed in the light sensor arrays. When the image signals have been stored in the shift registers 12 and 13, a shift signal is transmitted from a timing control unit 14 to the control terminals "CTR" of the shift registers 12 and 13 to cause image signal data stored in the shift registers 12 and 13 to be successively issued from output terminals "out" of the shift registers in mutual synchronism at each stage. The output signals from the shift registers 12 and 13 are fed back to the input terminals "in" thereof and reenter the shift registers 12 and 13. An exclusive-NOR gate 15 transmits a signal of a logic level "1" when the output signals from the shift registers 12 and 13 coincide with each other, and transmits a signal of a logic level "0" when the output signals from the shift registers 12 and 13 differ from each other. A counter 16 counts the "1" output signals transmitted by the exclusive-NOR gate 15 whenever successive synchronous image data from the shift registers 12 and 13 coincide with each other.

It is now assumed that the light sensor arrays 10 and 11 shown in FIG. 1 have m and n sensors, respectively, that m and n image data items are stored respectively in the shift registers 12 and 13, and that m<n. When m data items have been issued from the shift registers 12 and 13 after the start of data generation, all of the data items stored in the shift register 12 and first m data items stored in the shift register 13 have been compared with each other. At this time, the counter 16 has counted the number of bits which coincide with each other as a result of comparison of the image data items which are stored in the shift registers 12 and 13 and are not shifted relatively to each other, that is, under the condition in which the number of shifted data items is zero. In this condition, the data items which are stored in the shift register 12 have been shifted through one cycle back to their initial storage positions, and the data items stored in the shift register 13 have been shifted m bits to the right. The count in the counter 16 is now stored in a maximum coincidence number storage unit 17.

In response to a command from the timing control unit 14, the data items in the shift register 13 are further shifted by (n−m+1) bits, and the counter 16 is cleared, the net result being that the data items in the shift register 13 have been shifted one bit to the right from their initial positions. A counter 18, which serves to count the number of bits the data items in the shift register 13 have been shifted to the right from the initial data position, is incremented each time data items from the shift registers 12 and 13 have been compared. A second data comparison cycle is effected while successively shifting the data items in the shift registers 12 and 13 m times to the right in the same manner as described above. After the second data comparison cycle has been completed, the count $C_1$ in the counter 16 and a count $C_2$ in the maximum coincidence number storage circuit 17 are compared by a comparator 19, which stores the count $C_1$ into the maximum coincidence number storage circuit 17 whenever $C_1 \geq C_2$. At the same time, a count S1 in the shift counter 18 is stored in a shift number storage circuit 20. Thereafter, the data items in the shift register 13 are again shifted by (n−m+1) bits to the right, and the counter 16 is cleared.

The comparison of the data items stored in the shift registers 12 and 13, the comparison of counts in the counter 16 and the maximum coincidence number storage circuit 17, the resultant changing of the data in the maximum coincidence number storage circuit 17 and the shift number storage circuit 20, the shifting of the data items in the shift register 13 by (n−m+1) bits, and the clearing of the counter 16 are repeated a predetermined number of times. After the selected number of repetitive cycles has been completed, the maximum coincidence number storage circuit 17 has stored the maximum coincidence number produced as a result of successive determination of coincidence between the data items stored in the shift register 12 and a portion of the data items stored in the shift register 13, and the shift number storage circuit 20 has stored the number of relative shifts between the shift registers 12 and 13, that is, the deviation distance x as shown in FIG. 2D, which produced the maximum coincidence number stored in the maximum coincidence number storage circuit 17. At a final step of operation, the timing control unit 14 causes the data from the shift number storage circuit 20 to be registered at an output unit 21 which will transmit the registered data in the form of a distance signal to an external circuit.

With the foregoing conventional circuit for comparing image data to measure the distance to an object, it is necessary to circulate the data items through the shift registers 12 and 13 a number of times while changing the number of relative shifts of the stored data items until the maximum coincidence is reached between the two image data trains. Consequently, it takes a long period of time for the image data sets to be compared with each other. Where a rangefinder having such an image data comparison circuit is incorporated in an optical instrument such as a video camera which receives a scene while scanning its field of view, the image actually received by the camera tends to be out of focus since that image is likely to differ from the field of view that has been focused by the rangefinder because of the relatively long period of time required for the rangefinder distance measurement and resulting focus adjustment. Ordinary still cameras suffer from the same problem when an object to be photographed is moved abruptly or the camera wobbles before the shutter is closed. In order to overcome this problem the time required for distance measurement and particularly, the image data comparison time must be shortened.

It is an object of the present invention to provide an image data comparison circuit for rangefinders which overcomes the above-mentioned difficulties of the prior art by reducing the time required for distance measurement.

SUMMARY OF THE INVENTION

According to the present invention, the above and other objects are achieved by providing at least one shift register for storing image data items arranged so that the image data items can be read out in parallel transmission from certain stages of the shift register as they are shifted through the register. In addition, a coincidence detector is provided for comparing image data items from that shift register with image data items in another shift register and detecting data coincidence simultaneously, and counters for counting occurrences of coincidence detected by the coincidence detector circuits for each shift of the image data items are also included.

With this arrangement, detection of coincidence between image data items for all of the image data item shifts can be completed simply by shifting the stored data in the shift registers to the final stages thereof. Therefore, it is not necessary to circulate the image data items through the shift registers a number of times and shift the image data items each time to establish the desired number of shifts as required by the prior art. Determination of the maximum value of the numbers of occurrences of coincidence stored in the counters for the respective data shifts does not involve a substantial period of time even in the prior art arrangement. Therefore, the time required for distance measurements can be reduced by the reciprocal of the number of shifts at which the image data items are to be compared for detecting data coincidence. Since accurate distance measurement conventionally requires from about 10 to about 100 shifts, the time required for distance measurement can be reduced to less than about 1/10 the conventional time required for distance measurement.

DESCRIPTION OF PREFERRED EMBODIMENTS

Before the detailed circuits of the preferred embodiments of the invention are described, the arrangement of an overall circuit of a rangefinder in which the circuit of the invention is incorporated will be explained for an easier understanding of the present invention.

Figure 4:
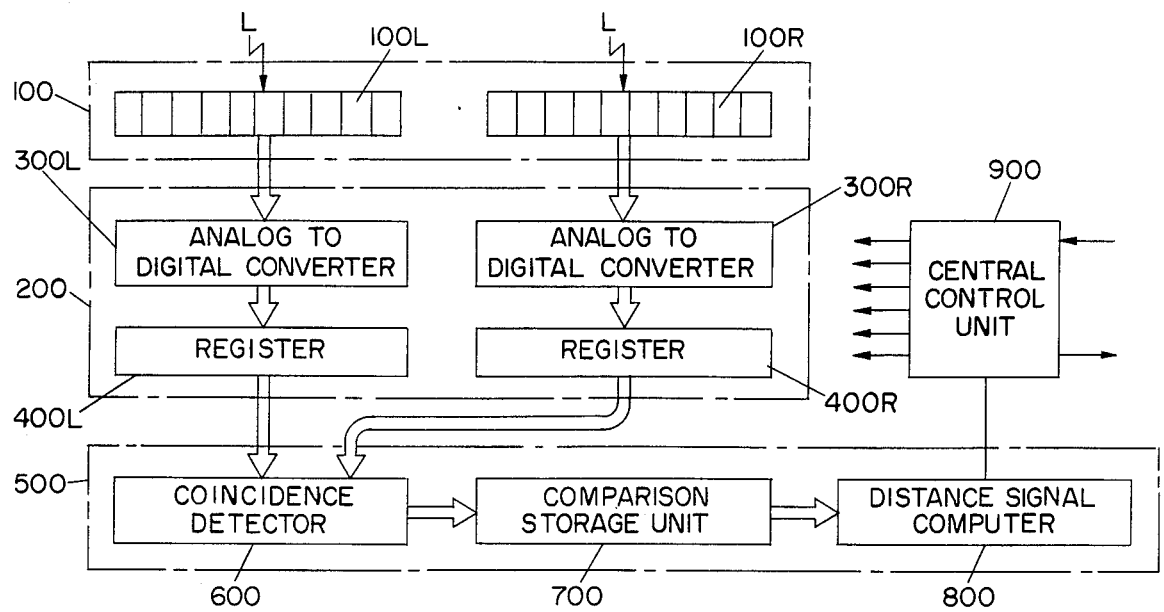
FIG. 4 is a schematic block diagram illustrating the arrangement of a representative rangefinder utilizing the improvement of the present invention.

FIG. 4 illustrates in block form an entire electronic circuit for measuring the deviation distance x as expressed by the number of light sensors. The entire illustrated electronic circuit, including light sensor arrays, is normally integrated in a single semiconductor chip. A light sensor assembly 100, indicated by the dot-and-dash line, includes a left light sensor array 100L and a right light sensor array 100R. Light beams L of images focused by small lenses for distance measurement or by a photographic lens fall on the left and right light sensor arrays 100L and 100R, which transmit electrical output signals, as shown by the arrows, to the left and right analog-to-digital converters (hereinafter referred to as "ADC") 300L and 300R, respectively, in a quantizing circuit 200.

The output signals from the light sensors may be supplied in series or parallel transmission to the ADCs. For the purpose of shortening the measurement time, however, parallel transmission of the output signals is preferred. The ADCs 300L and 300R convert the analog signals from the light sensors into digital values each having 1 bit, or a desired number of bits, which are then stored in associated registers 400L and 400R. These registers may comprise shift registers having as many stages as there are sensors in the respective light sensor arrays 100L and 100R. The shift registers 400L and 400R store the quantized digital values in the same sequence as the spatial sequence of the luminous intensities of the images falling on the light sensor arrays. Where the output signals from the ADCs are of multiple bits, the shift registers are composed of as many binary shift registers as there are the signal bits. The image data items are stored in the shift registers 400L and 400R at digital value distributions or shift register stages which are shifted by the deviation distance x between the left and right images on the light sensor arrays 100L and 100R.

For determining the deviation distance x from the image data items stored in the shift registers 400L and 400R in the shifted distributions, there are provided a coincidence detector 600, a comparison storage unit 700 for storing a signal corresponding to a detected coincidence from the coincidence detector unit 600, and a distance signal computing unit 800 for reading stored data out of the comparison result storage unit 700 and determining a shift number $x_n$ at which there is maximum coincidence between the two image data sets. The shift number $x_n$ is indicative of the number of light sensors which represents the deviation distance x. The distance signal computing circuit 800 computes the distance d to the object based on the above formula (1) for computing distance.

For many applications, however, the shift number $x_n$ may be produced directly as a distance signal rather than by first determining x and then d. The coincidence detector circuit group 600, the comparison storage unit 700, and the distance signal computer 800 jointly constitute a distance detector unit. A central control unit 900 responds to an external access signal to read a distance signal from the distance detector unit 500 and issue the distance signal to an external circuit. The central control unit 900 also serves as a timing control circuit for issuing clock pulses and control pulses to the various circuits.

Figure 1:
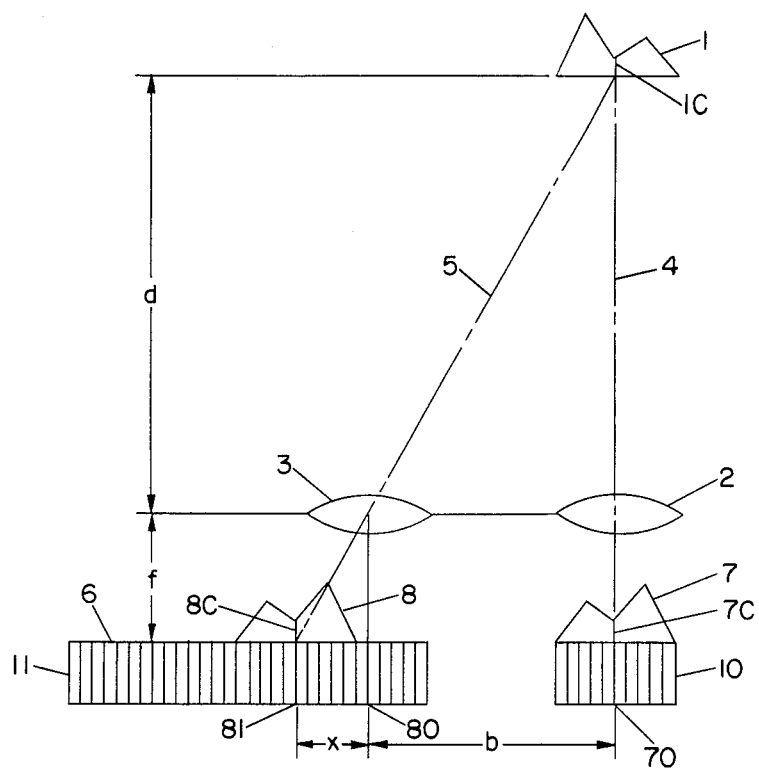
FIG. 1 is a schematic diagram explanatory of the principles of distance measurement using light sensor arrays.
Figure 2B:
FIGS. 2A-2D are graphical representations illustrating the manner in which analog image signals from the light sensors are quantized.
Figure 2A:
Figure 2D:
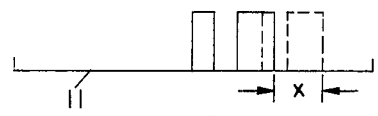
Figure 2C:
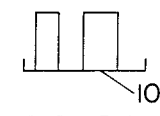
Figure 3:
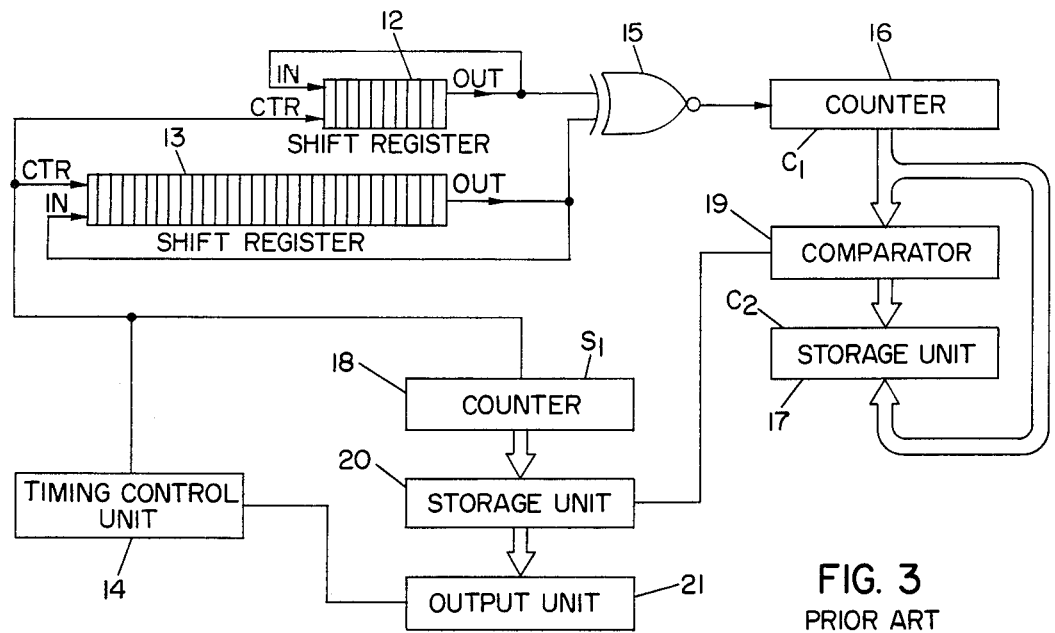
FIG. 3 is a schematic block diagram illustrating a conventional image data comparison circuit for distance measurement.
Figure 5:
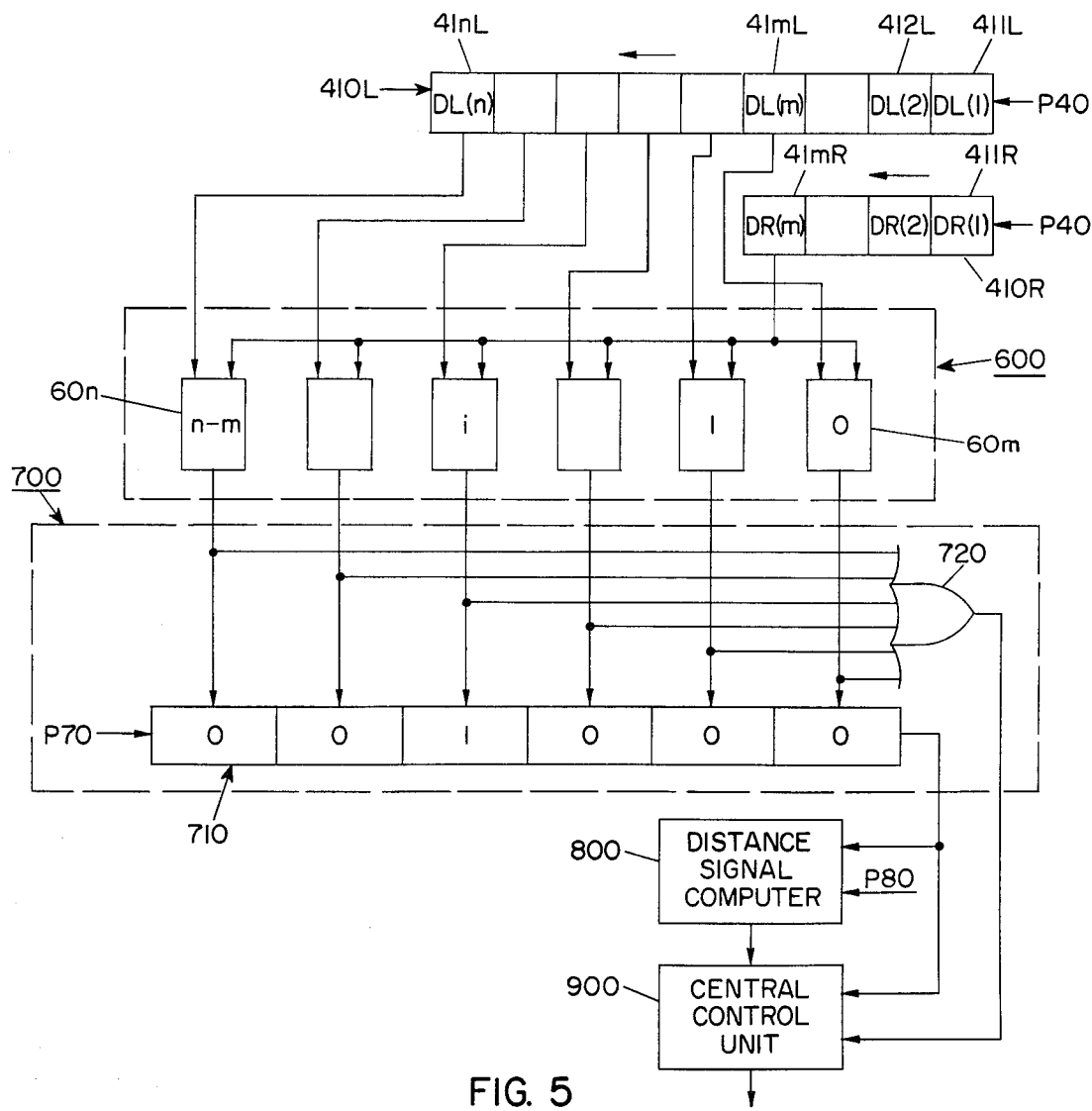
FIG. 5 is a schematic block diagram illustrating a typical image comparison circuit arranged according to one embodiment of the present invention.

FIG. 5 shows a typical embodiment of an image data comparison circuit according to the present invention. Shift registers 410L and 410R correspond respectively to the light sensor arrays 10 and 11 shown in FIG. 1 and are composed of n stages 411L-41nL and m stages 411R-41mR, respectively with n>m. Quantized image data items are supplied in serial or parallel transmission from the ADCs 300L and 300R shown in FIG. 4 to the shift registers 410L and 410R and are stored therein in the same sequence as that in which the sensors are arrayed in the light sensor arrays 100L and 100R. Each image data item is represented as having only one bit for the purpose of simplifying the illustration in FIG. 5. However, where each data item is of multiple bits, as many binary counters, for example, as there are bits of each data item may be provided.

The shift registers 410L and 410R are supplied synchronously with shift pulses P40 from the control circuit 900 of FIG. 4 for sequentially shifting the stored image data items to the left in the shift registers 410L and 410R. As illustrated, the shift register 410L is constructed to issue parallel output signals from the stages 41mL-41nL, and the shift register 410R is constructed to issue serial output signals from the stage 41mR at the left end.

Figure 6:
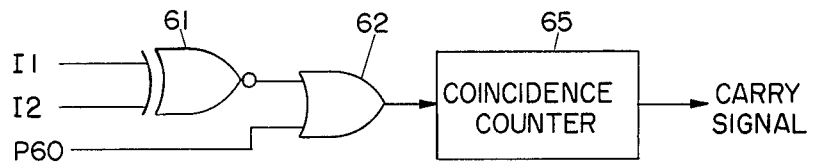
FIG. 6 is a schematic block diagram illustrating the arrangement of the coincidence detector circuit used in the image comparison circuit shown in FIG. 5.

The shift registers are connected to (n−m+1) coincidence detector circuits 60m-60n each constructed as shown in FIG. 6, the coincidence detector circuits 60m-60n jointly constituting the coincidence detector circuit group 600 as shown in FIG. 4. As shown in FIG. 6, each of the coincidence detector circuits 60m-60n includes an exclusive-NOR gate 61 having input terminals I1 and I2. One of the input terminals, I1 for example, of each coincidence detector circuit is supplied with an image data output signal from the final stage 41mR of the shift register 410R, whereas the other input terminals I2 of the coincidence detector circuits are supplied with the parallel output signals from the stages 41mL–41nL of the shift register 410L, as illustrated in FIG. 5.

In an initial condition before the shift pulses P40 are applied, the stages of the shift register 410L store image data items DL(1)–DL(n), respectively, and the stages of the shift register 410R store image data items DR(1)–DR(m), respectively. When a first shift pulse P40 is applied, the mth image data item DL(m) in the shift register 410L is fed to one of the input terminals of the exclusive-NOR gate 61 of the coincidence detector 60m, and the mth image data item DR(m) in the shift register 410R is applied to the other input terminal of the exclusive-NOR gate 61, all of the other image data items in each register being transferred one stage to the left as shown by the arrows. When the next succeeding shift pulse P40 is applied, the image data items in the shift registers 410L and 410R are again shifted one stage to the left as shown by the arrows, and hence the image data item DL(m−1) is fed from the stage 41mL of the shift register 410L to the coincidence detector circuit 60m and the image data item DL(m−1) is fed from the stage 41mR of the shift register 410R to the coincidence detector circuit 60m. Each time the two input signals are supplied to the exclusive-NOR gate 61 of the coincidence circuit 60m, the exclusive-NOR gate 61 detects whether the two supplied input signals coincide with each other and issues an output signal only when they coincide with each other. The output signal from the exclusive-NOR gate 61 goes through an OR gate 62 to a coincidence number counter 65 which counts the number of occurrences of coincidence. The above operation is cyclically repeated until the image data items DL(1) and DR(1) originally stored in the first stages of the shift registers 410L and 410R are issued from the mth stages 41mL and 41mR of the shift registers 410L and 410R.

As described above, the coincidence detector circuit 60m compares the image data items originally stored in the correspondingly numbered stages of the shift registers 410L and 410R at all times. Therefore, the coincidence detector circuit 60m detects whether the data items coincide with each other under the condition in which the image data items in the shift registers 410L and 410R are not shifted relatively to each other, that is, the number of shifts is zero. This condition is indicated by "0" in the block representing the coincidence detector circuit 60m.

The coincidence detector circuit 60n at the left end of the shift register 410L will now be considered. When a first shift pulse P40 is applied, the coincidence detector circuit 60n detects whether the image data time DL(n) in the final stage 41nL of the shift register 410L coincides with the image data item DR(m) in the stage 41mR of the shift register 410R. Accordingly, the coincidence detector circuit 60n compares the image data items that are shifted (n−m) from each other to detect whether they coincide with each other. Since the number of shifts (n−m) remains unchanged when successive shift pulses are applied, the coincidence detector circuit 60n compares two image data items that are shifted (n−m) from each other at all times. Likewise, the coincidence detector circuits positioned between the coincidence detector circuits 60m and 60n compare two image data items that are shifted 1, 2, . . . , n−m from each other, respectively, to detect whether the image data items coincide with each other. Therefore, the coincidence detector circuits 60m−60n of the coincidence detector circuit group 600 detect coincidence of two image data items that are shifted by any amount from 0 to n−m from each other.

Based on the above principle of operation of the circuit, the image data items that are shifted 0, . . . , n−m from each other are compared simultaneously in parallel to determine whether they coincide with each other in (n−m+1) combinations.

The coincidence number counters 65 shown in FIG. 6, which are within the coincidence detector circuits 60m–60n, store the numbers of occurrences of coincidence between two image data items that are shifted from 0 to (n−m) stages from each other. For distance measurement, it is necessary to find the largest of the stored numbers representing occurrences of coincidence. This can be accomplished by applying a readout pulse P60 to each of the OR gates 62 in the coincidence detector circuits 60m–60n. Each time a readout pulse P60 is applied, the OR gate 62 is opened to add "1" to all of the coincidence number counters 65. When readout pulses are repeatedly applied, the coincidence number counter which stores the largest number of occurrences of coincidence, e.g., the coincidence number counter corresponding to the number of shifts i, causes an overflow to thereby produce a carry signal "1", for example.

A shift register 710, shown in FIG. 5, constitutes the comparison result storage circuit 700 illustrated in FIG. 4 and has (n−m+1) stages corresponding respectively to the coincidence detector circuits 60m–60n. The shift register 710 is constructed to allow parallel data storage into its successive stages. The shift register 710 is responsive to the carry signal "1" from the particular coincidence counter "i" in the coincidence detector 600 which is at a position corresponding to the number of shifts required for coincidence to store a "1" signal in the corresponding stage of the shift register 710. The comparison result storage unit 700 also includes an OR gate 720 which is supplied with parallel carry signals from the coincidence detector circuits 60m–60n. Whenever a carry signal is received, the OR gate is opened to cause the central control unit 900 to stop supplying the readout pulses P60 to the coincidence number counters 65, which are then prevented from being incremented and from generating other carry signals. As a result, only that stage of the shift register 710 which corresponds to the coincidence number counter having the maximum number of coincidence occurrences stores a "1" signal.

The number of shifts i at which there is maximum coincidence between the image data items can be read out from the register 710 by applying count pulses P70 from the central control unit 900 to the shift register. In the illustrated embodiment, the distance signal computer 800 comprises a simple counter which is supplied with count pulses P80 from the central control unit 900 in synchronism with the readout pulses P70 after the application of readout pulses P70 to the shift register 710 has started. The count in the computer 800 is therefore incremented by successive "1"s in synchronism with shifting of the data in the shift register 710 successively through its stages to the right in response to application of the readout pulses P70. As soon as the logic level "1" corresponding to the location "i" of the maximum number of coincidence occurrences is transferred from the shift register 710, the central control unit 900 responds to stop delivery of the count pulses P80, whereupon the counter 800 stops counting the count pulses and stores the number of shifts i as the count. Thereafter, the central control circuit 900 reads the count out of the counter 800 and issues the count to an external circuit.

Figure 7A:
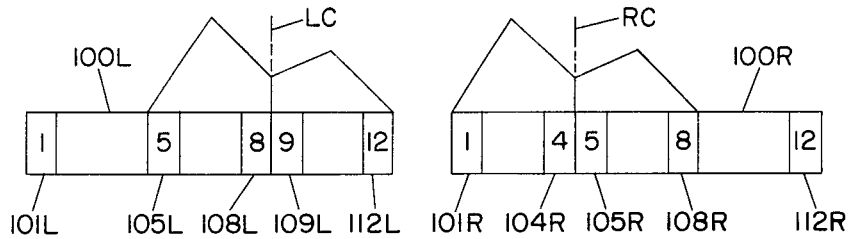
FIGS. 7A and 7B are schematic diagrams illustrating the operation of a representative image comparison circuit according to another embodiment of the present invention.

Another embodiment of the present invention will be described with reference to FIGS. 7A, 7B and 8. According to this embodiment, the arrangement for shifting image data items with respect to each other is different from that of the preceding embodiment. For an easier understanding, the process for shifting image data items relatively to each other will first be described with reference to FIG. 7A. As shown in FIG. 7A, two light sensor arrays 100L and 100R are composed of equal numbers of light sensors, i.e., twelve light sensors 101L–112L and twelve light sensors 101R–112R, respectively. The axis of the viewfinder for aiming at an object to which the distance is to be measured is not displaced toward either of the light sensor arrays, but is located half way between the light sensor arrays 100L and 100R, unlike the viewfinder of the previous embodiment. Accordingly, when the object is at an infinite distance, the centers LC and RC of images of the object are displaced equally from an intermediate position between the light sensor arrays 100L and 100R. More specifically, the center LC of the lefthand image, as illustrated, is positioned between the light sensors 108L and 109L of the lefthand light sensor array 100L which are close to the righthand end thereof, with the image being distributed from the light sensor 105L to the light sensor 112L. The center RC of the righthand image, as shown, is positioned between the light sensors 104R and 105R of the righthand sensor array 100R which are close to the lefthand end thereof, with the image being distributed from the light sensor 101R to the light sensor 108R. The numerals in the blocks of the light sensors correspond to the numbers of the light sensors.

Figure 7B:
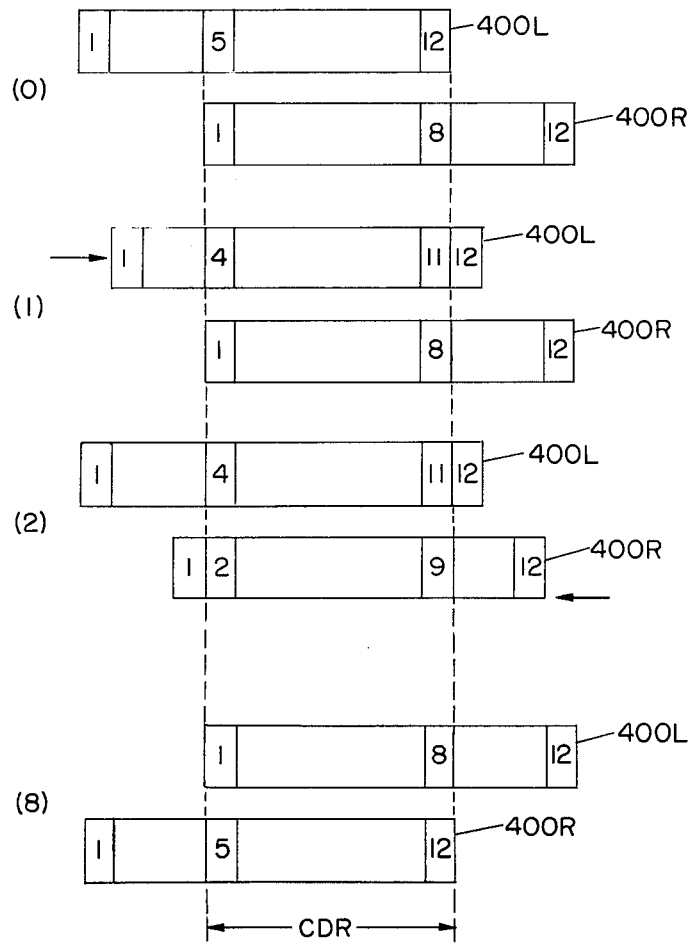

FIG. 7B illustrates four sets of shift register conditions (0, 1, 2 . . . 8) showing the relation between the shift registers 400L and 400R, which have twelve stages corresponding respectively to the light sensors of the light sensor arrays 100L and 100R for various object distances. For each illustrated condition the shift registers 400L and 400R are shown in vertical adjacent positions for a better understanding. The numerals in the blocks indicative of the stages represent the stage numbers of the shift registers as well as the image data item numbers corresponding to the numbers of the light sensors.

As shown in FIG. 7A, when the object is at an infinite distance, the image on the lefthand light sensor array 100L is distributed over the light sensors having sensor numbers 5–12, and the image on the righthand light sensor array 100R is distributed over the light sensors having sensor numbers 1–8. Assuming that the number of shifts between the two images is zero when the distance to the object is infinity, a condition which is regarded as a reference condition, the numbers of those sensors which will be detected as coinciding with each other under such a reference condition are mutually related in the light sensor arrays in the manner shown in the uppermost or "(0)" portion of FIG. 7B. More specifically, the 5th image data item, for example, in the lefthand shift register 400L should be compared with the 1st image data item in the righthand shift register 400R when the number of shifts is zero.

As an object moves closer to the rangefinder from an infinite distance, the image of the object on the lefthand light sensor 100L is displaced to the left, while the image of the object on the righthand light sensor 100R is displaced to the right. The image data items in the shift registers 400L and 400R will therefore move away from mutually coinciding relation unless the image data items are shifted in response to the displacement of the images. FIG. 7B illustrates the correspondences between the numbers of the image data items in the shift registers which are to be compared with each other for detecting data coincidence while being successively shifted 1, 2 and 8 units relatively to each other. The portion of FIG. 7B designated "(1)" shows the correspondence between the numbers of the image data items compared when the number of the shift is 1 so that the data item numbers of the shift register 400L are shifted one unit to the right in the direction of the arrow from the position designated "(0)" corresponding to infinity. The 4th image data item, for example, in the lefthand shift register 400L is to be compared with the 1st image data item in the righthand shift register 400R for data coincidence. Likewise, the portion of FIG. 7B designated "(2)" shows the correspondence between the numbers of the image data items compared when the number of shifts is 2. The data item numbers of the shift register 400R are shifted one to the left in the direction of the arrow from the position "(1)". The 4th image data item, for example, in the lefthand shift register 400L is to be compared with the 2nd image data item in the righthand shift register 400R for data coincidence As the number of shifts increases, the numbers of the image data items to be compared between the shift registers will alternately be shifted one by one until finally the image data item numbers have a correspondence as shown in the portion "(8)" of FIG. 7B.

Figure 8:
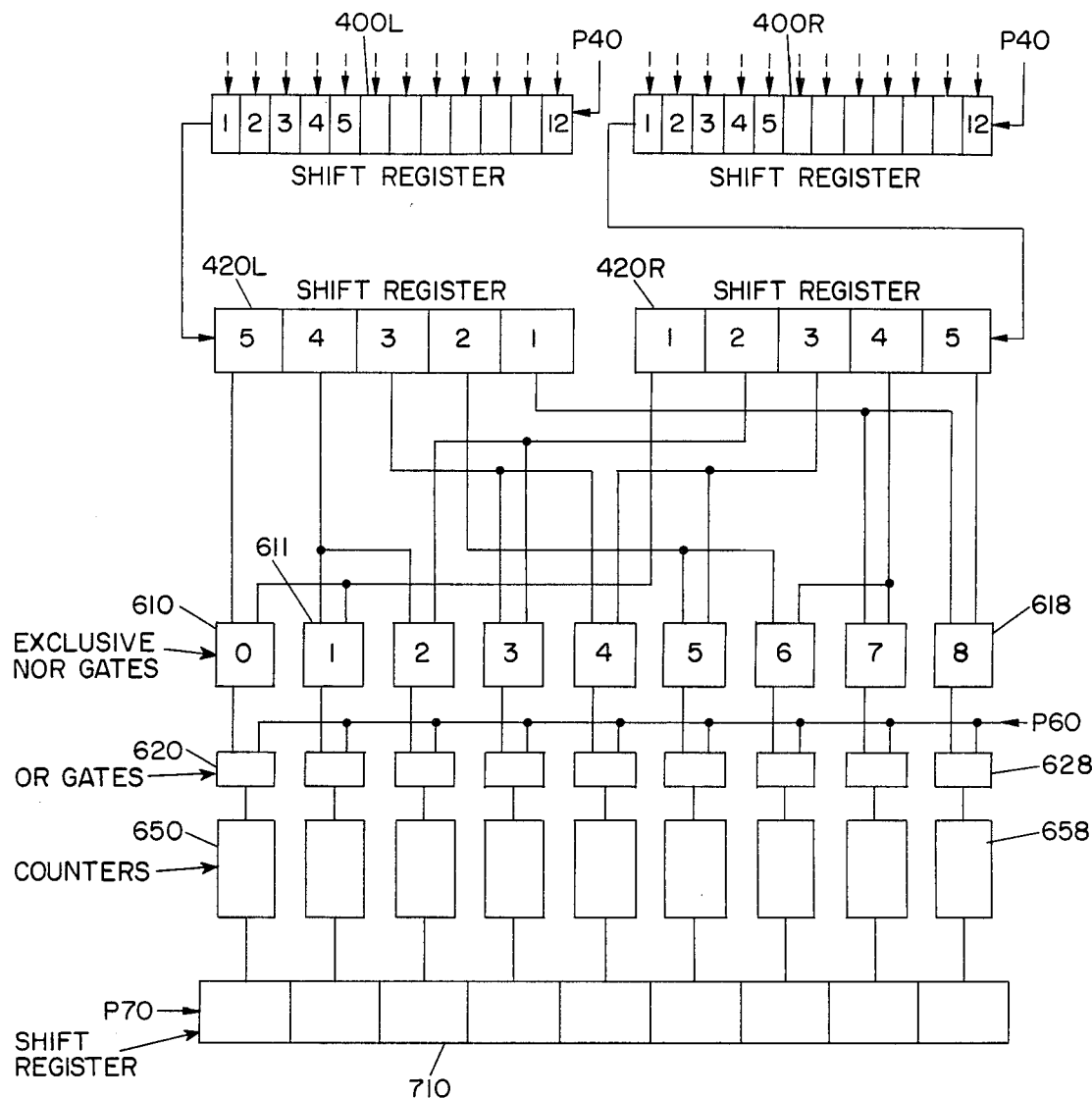
FIG. 8 is a schematic block diagram illustrating the embodiment of the invention described with reference to FIGS. 7A and 7B.

FIG. 8 shows a circuit for simultaneously detecting whether the image data items in the shift registers coincide with each other for each of the shifts 0–8 based on the data correspondences shown in FIG. 7B. Digital image data items are transferred in parallel from ADCs (not shown) into the stages of the shift registers 400L and 400R. Two other shift registers 420L and 420R receive data items in sequence from the shift registers 400L and 400R, respectively. Image data item numbers in the shift registers 420L and 420R are shown in FIG. 8 as being entered in opposite directions for a simpler illustration of the connections to a coincidence detector circuit (described hereinafter). The shift registers 420L and 420R may be integral with the shift registers 400L and 400R, respectively, permitting data to be entered in them directly from the ADCs. For facilitating illustration, however, the shift registers 420L and 420R are shown here as being separate from the shift registers 400L and 400R. Image data items are successively shifted from the shift registers 400L and 400R to the shift registers 420L and 420R, respectively, in response to shift pulses P40 from the central control unit. The shift registers 420L and 420R are arranged to transmit image data items from the stages thereof in parallel. Unlike the preceding embodiment, both of the shift registers 420L and 420R are capable of such parallel data transmission.

The coincidence detector circuit is shown in detail in FIG. 8 and includes an upper row of exclusive-NOR gates 610–618, a middle row of OR gates 620–628, and a lower row of counters 650–658, which are connected in the same arrangement as that of the exclusive-NOR gate 61, the OR gate 62, and the counter 65 illustrated in FIG. 6. The exclusive-NOR gates 610–618 are connected as shown to the parallel output terminals of the 5-stage shift registers 420L and 420R. The first image data items are shown here as having reached the final stages of the shift registers 420L and 420R. At this time, the exclusive-NOR gate 610 is supplied with the 5th data item from the lefthand shift register 420L and the 1st data item from the righthand shift register 420R, a condition which corresponds to the data item relationship as shown in the portion "(0)" of FIG. 7B. The exclusive-NOR gate 610 can therefore detect whether those image data items coincide with each other at the time the number of shifts is 0.

Likewise, the exclusive-NOR gate 611 is supplied with the 4th data item from the lefthand shift register 420L and the 1st data item from the righthand shift register 420R, a condition which corresponds to the data item relationship as shown in the protion "(1)" of FIG. 7B, and hence can detect whether those image data items coincide with each other at the time the number of shifts is 1. The blocks of the exclusive-NOR gates 610–618 show therein the numbers of shifts 0-8 between the image data items which the gates are to compare for detecting data coincidence. The image data items in the shift registers 420L and 420R are shifted to the right and left, respectively, successively through stages thereof to determine whether or not the image data items coincide with each other and the numbers of occurrences of coincidence for each NOR gate are stored in the counters 650–658, respectively. The range in which the image data items are compared for data coincidence is indicated by CDR in FIG. 7B. It will be seen from the above that the circuit of FIG. 8 is capable of detecting whether or not the lefthand and righthand images each composed of eight image data items coincide with each other.

A shift register 710 shown in FIG. 8 serves as the same type of comparison result storage circuit as that in the embodiment of FIG. 5. The shift register 710 stores a first carry signal from the counters 650–658 which are incremented by readout pulses P60 applied to the OR gates 620–628. The signal record stored in the shift register 710 will be issued from the shift register 710 in response to readout shift pulses P70 applied thereto.

In the foregoing embodiments, the number of the light sensors in each light sensor array, the number of shifts at which coincidence between two images is to be detected, and the number of image data items to be compared for detecting image coincidence, are relatively small for the sake of brevity. However, such numbers are substantially increased in an actual rangefinder. For example, the total number of shifts is dependent on the number of segments into which the distance to an object is divided between an infinite distance and a closest point, and may range from 10 to 100 or more. The larger the number of image data items to be compared for detecting data coincidence the greater is the accuracy of distance measurement and it is usually preferable to compare several tens of image data items. As the number of image data items to be compared is increased, the number of light sensors in each light sensor array must be increased, and the number may exceed 100 in many applications. The principles of the present invention are equally applicable to such a complex arrangement, and are somewhat more advantageous in arrangements having many light sensors. Thus, in accordance with the present invention the image data items from left and right sensors of a rangefinder can be compared to detect data coincidence simultaneously for the total number of shifts at which coincidence between the image data items is to be detected, so that the time required for comparing the image data items is substantially reduced.

Where a video camera is used to pick up a scene while scanning or to pick-up an object which moves quickly the arrangement of the invention produces a well-focused sharp picture since the distance to the object can be measured accurately for the focusing operation. The arrangement of the invention can also reduce blurring in pictures taken by ordinary still cameras which might occur because of wobbling of the hands before the shutter is closed. The present invention is much more advantageous than the prior art in those cases where the distance measurement segments are smaller and more accurate. The present invention is not only applicable to optical instruments such as cameras, but also to various other uses requiring distance measurement, such as measurement of the distance to a vehicle in front of another vehicle in order to ensure preservation of a safe distance between vehicles such as automobiles. The present invention is more advantageous when the object to which the distance to which is to be measured moves quickly.

The time required for quantizing analog image signals from the light sensors to generate image data items has been an obstacle to efforts to reduce the time required for distance measurements. However, recent advances in semiconductor technology have made it easy to reduce such a time by parallel signal readout and analog-to-digital conversion. Therefore, the present invention can greatly reduce the time required for distance measurement and hence improve the performance of a rangefinder and provide broader application for such rangefinders.

The electronic circuits required by the present invention, including the light sensor arrays, can easily be integrated on a semiconductor chip a few millimeters square, and can provide a rangefinder of high performance and small size.

We claim:

1. An image data comparison circuit for a rangefinder wherein two digital image signal trains from corresponding optical sensor arrays are compared while being shifted relatively to each other so that the distance to an object can be determined from the number of shifts between the digital image signal trains at the time the digital image signal trains have maximum coincidence, said data comparison circuit comprising a pair of shift registers for storing image data items from the two digital image trains, respectively, at least one of the shift registers being arranged to transmit stored image data items in parallel, coincidence detector means responsive to receipt of image data items transmitted from the shift registers, for detecting data coincidence of image data items from the two image signal trains, simultaneously, for a plurality of said relative shifts of the image data items, and counter means for counting output signals of the coincidence detector means indicative of results of image data coincidence detection by the coincidence detector means.

2. A rangefinder comprising:
a pair of optical sensor arrays for receiving respective rays of light falling thereon from an object to which the distance is to be measured through two optical paths differing from each other, shift registers provided correspondingly to said optical sensor arrays, for storing respective digital image signal trains obtained by quantifying the respective output signals of said optical sensor arrays, at least one of the shift registers being arranged to transmit stored image data items in parallel, coincidence detector means responsive to receipt of image data items transmitted from the shift registers, for detecting data coincidence of image data items from the image signal trains, simultaneously, for a plurality of relative shifts of the image data items, counter means for counting the number of times of coincidence detection done by said coincidence detector means for each shift number in synchronism with a shift action of said shift registers, and a distance signal computing circuit for computing a distance signal indicative of the distance to the object on the basis of the shift number which contains the maximum number of coincidences counted in said counter means.

* * * * *